(12) United States Patent
Soucek et al.

(10) Patent No.: US 8,653,218 B2
(45) Date of Patent: Feb. 18, 2014

(54) SYNTHESIS AND CHARACTERIZATION OF AMINE TERMINATED CYCLOALIPHATIC SUBSTITUTED POLYSILOXANES

(75) Inventors: Mark D. Soucek, Akron, OH (US); David P. Dworak, Middletown, CT (US); Ruby Chakraborty, Allison Park, PA (US)

(73) Assignee: The University of Akron, Akron, OH (US)

( * ) Notice: Subject to any disclaimer, the term of this patent is extended or adjusted under 35 U.S.C. 154(b) by 270 days.

(21) Appl. No.: 12/671,557

(22) PCT Filed: Jul. 24, 2008

(86) PCT No.: PCT/US2008/008977
§ 371 (c)(1),
(2), (4) Date: Jul. 26, 2011

(87) PCT Pub. No.: WO2009/017651
PCT Pub. Date: Feb. 5, 2009

(65) Prior Publication Data
US 2011/0275778 A1    Nov. 10, 2011

Related U.S. Application Data

(60) Provisional application No. 60/962,845, filed on Aug. 1, 2007.

(51) Int. Cl.
*C08G 77/26* (2006.01)
(52) U.S. Cl.
USPC .................... 528/38; 528/28; 528/31; 528/40
(58) Field of Classification Search
None
See application file for complete search history.

(56) References Cited

U.S. PATENT DOCUMENTS

| | | | |
|---|---|---|---|
| 5,049,627 A | 9/1991 | Edelman | |
| 5,254,657 A * | 10/1993 | Inoue | 528/17 |
| 5,306,615 A | 4/1994 | Breillatt | |
| 5,773,561 A | 6/1998 | Sachdev | |
| 6,133,394 A | 10/2000 | Furukawa | |
| 6,500,439 B1 | 12/2002 | Morita | |
| 6,503,632 B1 | 1/2003 | Hayashi | |
| 6,750,309 B1 | 6/2004 | Chu | |
| 6,770,708 B2 | 8/2004 | Kadlec | |
| 2003/0104944 A1 | 6/2003 | Humble | |

OTHER PUBLICATIONS entitled "Synthesis of Epoxy and Amine Functional Siloxanes for Thermally Cured Coating" authored by Chakraborty et al. and published in Polymer Preprints (2006) 47(2), 1210-1211 for ACS Meeting 232: Sep. 10-14, 2006, San Francisco, CA.*
Soucek, Mark D., et al., "A New Class of Silicone Resins for Coatings", Journal of Coatings Technology and Research, vol. 4, No. 3, 2007, pp. 263-274.

* cited by examiner

*Primary Examiner* — Marc Zimmer
(74) *Attorney, Agent, or Firm* — Renner Kenner Greive Bobak Taylor & Weber

(57) ABSTRACT

The present invention relates to novel amine terminated cycloaliphatic polysiloxanes, and preparations thereof. More particularly, the invention provides several reaction schemes for the synthesis of amino-functionalized cyclo-aliphatic silicones and the products produced by the reaction schemes. In one embodiment of the invention, an amine functionalized silicone is prepared through a base-catalyzed ring-opening reaction. In another embodiment of the invention, an amine functionalized silicone is prepared through the hydrosilation of a silicone oligomer through the blocking and deblocking of an amine terminated in a vinyl group.

10 Claims, 11 Drawing Sheets

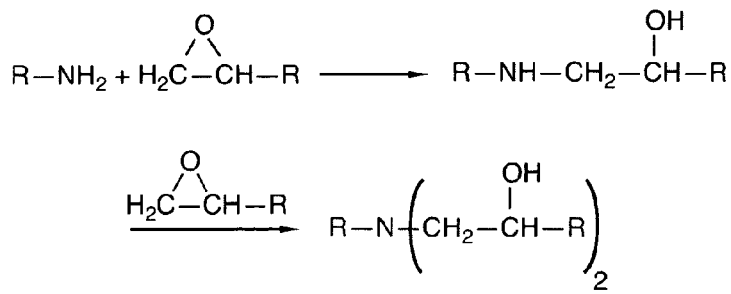
FIG. 1
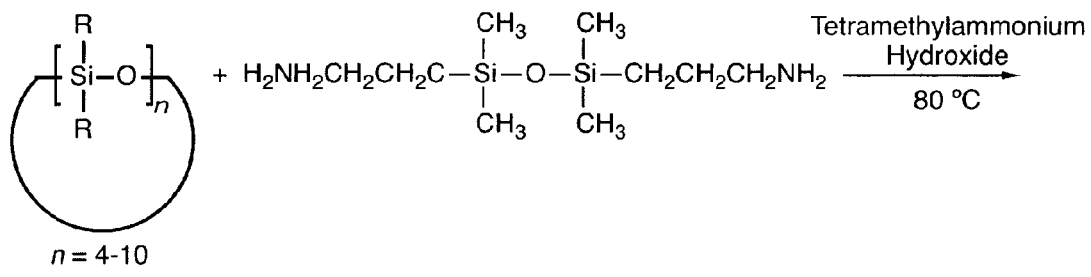
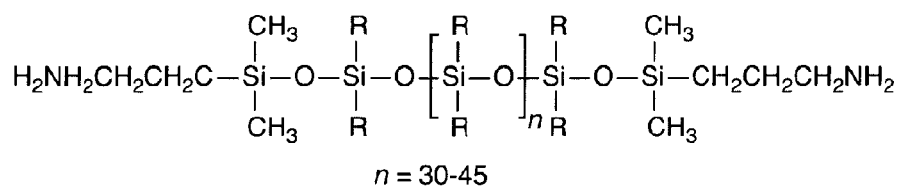
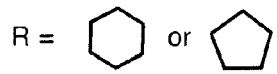
FIG. 2

SYNTHESIS AND CHARACTERIZATION OF AMINE TERMINATED CYCLOALIPHATIC SUBSTITUTED POLYSILOXANES

FIELD OF THE INVENTION

The present invention relates to novel amine terminated cycloaliphatic polysiloxanes, and preparations thereof. More particularly, the invention provides several reaction schemes for the synthesis of amino-functionalized cyclo-aliphatic silicones and the products produced by the reaction schemes. In one embodiment of the invention, an amine functionalized silicone is prepared through a base-catalyzed ring-opening reaction. In another embodiment of the invention, an amine functionalized silicone is prepared through the hydrosilation of a silicone oligomer through the blocking and deblocking of an amine terminated in a vinyl group.

BACKGROUND OF THE INVENTION

The versatility of epoxies arises from the large number of epoxy resins and curing agent combinations. Each combination yields a unique molecular structure. Epoxy resins have found extensive use in a variety of applications including flooring, sealants, coatings, and adhesives since their introduction in the 1940s.

Although the numerous possible combinations of resins and curing agents enable a very large number of unique molecular structures, some combinations of physical properties present significant challenges. For instance, it is difficult to have a very flexible yet very durable material, because the factors that improve one property often degrade the other. Although it is difficult to achieve a material having both flexibility and durability, such materials are highly desirable because they aid in the distribution of stress.

Materials that are both flexible and durable are desirable for applications that require thick films such as tank linings, floor coatings, adhesives, and sealants. Where additional flexibility is required, epoxy system formulation can take several routes. However, most approaches improve either flexibility or durability, but rarely both. For instance, increasing the molecular weight of the epoxy resin or curing agent while maintaining the same number of reactive sites per molecule provides greater durability. Unfortunately, this typically increases viscosity and lowers heat resistance, while providing only a modest increase in durability.

Alternatively, incorporating epoxy resins having flexible backbone segments into epoxy amine systems can impart higher degrees of elongation and lower stiffness, i.e. such materials are more flexible. Additionally, acid functional oils such as castor or cashew nut shell oil, or polyalkylene glycols (polyethylene or polypropylene glycol), are generally used as modifying agents to increase flexibility and toughness. However, both of these options generally result in sacrificing heat and chemical resistance.

Plasticizers have also been unsatisfactory in developing flexible formulations. For instance, plasticizers such as phthalates, sebacates, and phosphates are fully compatible during cure, but separate from the resin or migrate toward the surface after cure.

Another series of routes draw on polysiloxane material and blends thereof. The high bond strength of the Si—O bond results in high thermal and oxidative stability. Furthermore, polysiloxanes tend to be extremely flexible. Previous work has blended polysiloxanes with polyimides, thereby achieving a synergistic improvement in thermal stability. Additionally, epoxy and amine functionalized PDMS compositions are commercially available for blending, but offer limited compatibility with many other coating resins. Somewhat broader ranges of compatibility have been achieved by chemically modifying silicone oils. Finally, cycloaliphatic coating formulations made from diepoxy polyol and caprolactone polyol have been blended with siloxane functionalized caprolactone polyols. However, such blends result in reduced pot life.

A material having flexibility, durability, and chemical and thermal resistance could be achieved by functionalizing siloxanes with cycloaliphatic substituents and amines. However, until now amine functionalized cycloaliphatic substituted polysiloxanes have been unknown in the art due to substantial difficulties in their preparation. The present invention overcomes these difficulties, and teaches methods for preparing such compounds. Furthermore, the present invention enables molecular weight control, circumvents the steric effects of bulky cycloaliphatic substituents, permits the use of a wide variety of previously inaccessible crosslinking agents, and enables post-polymerization hydrosilation. Accordingly, the present invention fills a substantial gap in the art.

SUMMARY OF THE INVENTION

The invention relates to the synthesis of amine-functionalized cyclo-aliphatic silicone oligomers, wherein the cycloaliphatic groups are either pentyl groups or hexyl groups.

In one embodiment, the invention provides a silicone comprising amino end groups on a cyclo-aliphatic silicone oligomer wherein the cyclo-aliphatic group is attached to the Si atom of the silicone and wherein the cyclo-aliphatic group is a cyclo-pentyl group or cyclo-hexyl group.

In another embodiment, the invention provides a method to synthesize an amino-functionalized cyclo-aliphatic silicone comprising:

(a) conducting a base-catalyzed ring opening of a cyclo-aliphatic silicone oligomer with a diamine having the structural formula:

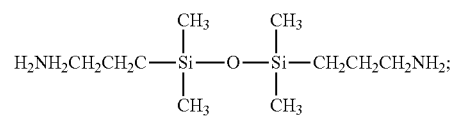

and (b) generating a product with the structural formula below from the reaction of step (a):

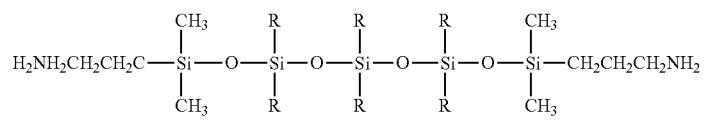

wherein R is a pentyl group or a hexyl group.

In still another embodiment, the invention provides a method to synthesize an amino-functionalized cyclo-aliphatic silicone comprising:

(a) conducting a hydrosilation reaction of a cyclo-aliphatic silicone oligomer with a blocked diamine terminating in a vinyl group and having the structural formula:

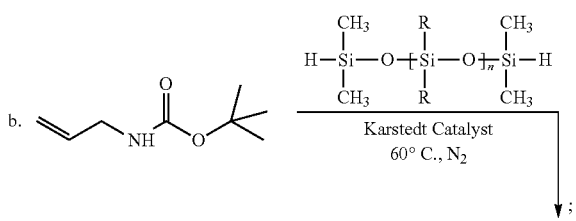

(b) generating an intermediate having the structural formula below from the reaction of step (a):

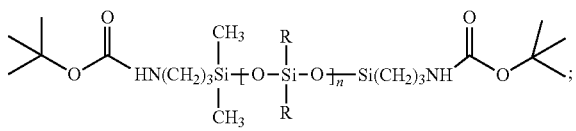

and, (c) deblocking the intermediate from step (b) to form an amine-functionalized cyclo-aliphatic silicone oligomer having the structural formula:

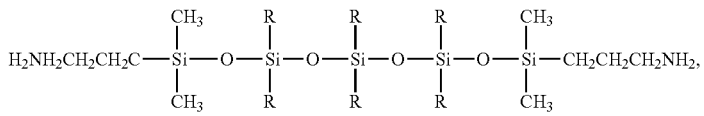

wherein R is a pentyl group or a hexyl group.

These and other embodiments of the invention will become apparent from reading and understanding the disclosure provided herein.

BRIEF DESCRIPTION OF THE DRAWINGS

FIG. 1 is a reaction scheme showing epoxy and primary amine reacting to form secondary and tertiary amines;

FIG. 2 is a reaction scheme showing formation of amine terminated cycloaliphatic substituted polysiloxanes;

DETAILED DESCRIPTION OF THE INVENTION

Figure 3:
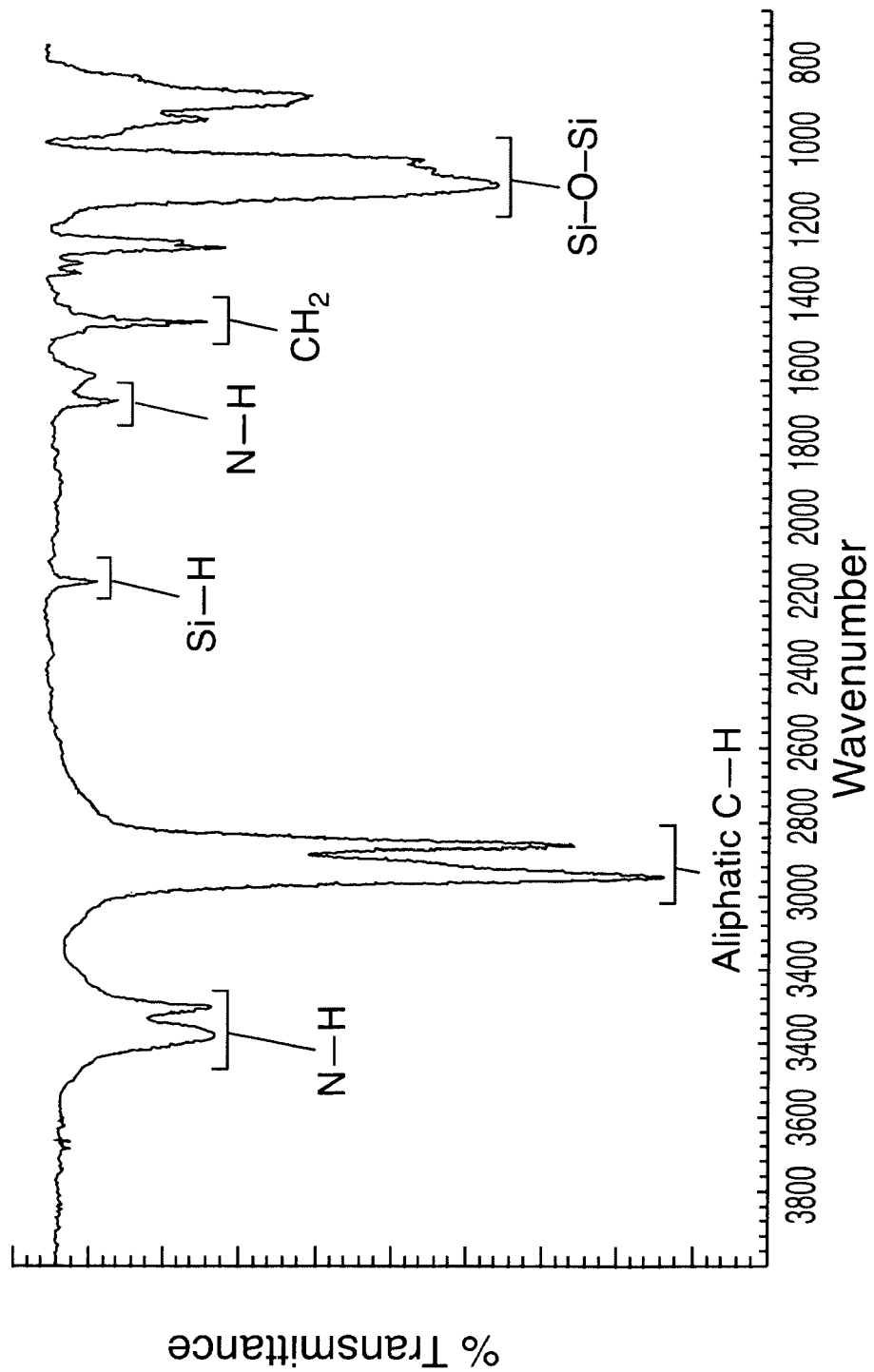
FIG. 3 is an FT-IR spectrum of an amine terminated poly(dicyclopentylsiloxane-co-cyclopentylhydrosiloxane)

The synthesis of amine functionalized poly(dicyclopentylsiloxane-co-cyclopentylhydrosiloxane) and poly(dicyclohexylsiloxane-co-cyclohexylhydrosiloxane) is taught herein by two alternative methods. The first is a method using a base catalyzed anionic ring opening polymerization of cycloaliphatic substituted polysiloxane oligomers. The second is a synthesis of aliphatic amine functionalized siloxane in a three step reaction involving (a) the blocking of allylamine, (b) the hydrosilation of the protected allylamine with hydride functional siloxane, and (c) deblocking of the hydrosilation product. The polysiloxanes produced are characterized using $^1$H NMR, $^{29}$Si NMR, and FT-IR. Because both reaction schemes produce the same end product, the characterization of both are the same, though only one may be presented for certain aspects.

Cyclopentyl and cyclohexyl substituted polysiloxanes terminated with amino groups are prepared. Initially, the cycloalkene and dichlorosilane are reacted at high pressure (approx. 250 psi) and high temperature (120° C.) to yield the cycloaliphatic dichlorosilane in a two step process. Both the mono- and disubstituted chlorosilane monomers undergo an oligomerization to produce cyclic oligomers of low molecular weight (about 2,000 g/mol). Amine terminated polysiloxanes are produced via base catalyzed ring opening polymerization of the cyclic oligomers with 1,3-bis(3-aminopropyl)tetramethyldisiloxane to yield low molecular weight polysiloxanes (about 9,000 g/mol, amine equivalent weight of about 4300 g/equiv). The polysiloxanes are characterized by $^1$H and $^{29}$Si NMR, and FT-IR. The amine terminated polysiloxane is mixed with a cycloaliphatic epoxy functionalized cycloaliphatic polysiloxane in order to produce crosslinked epoxy-amine films. The mechanical and physical properties of the film are evaluated and reveal a glass transition of 29.5±0.7° C. for the cyclopentyl substituted polysiloxane and 38.6±0.7° C. for the cyclohexyl substituted polysiloxane. Evaluation of pull-off adhesion indicates that a 0.5 MPa normal force is required to remove the epoxy amine film from an aluminum substrate.

Preparations of amine functionalized poly(dicyclopentylsiloxane-co-cyclopentylhydrosiloxane) and poly(dicyclohexylsiloxane-co-cyclohexylhydrosiloxane are taught herein according to the process of the present invention. The process includes a base catalyzed anionic ring opening polymerization of cycloaliphatic substituted cyclic oligomers. The novel process enables molecular weight control while preserving the amine functionality. The cycloaliphatic groups do not interfere with the ring opening polymerization mechanism, which results in polymerization forming low molecular weight products in a short period of time. The ability to maintain the silane functionality throughout the synthesis enables additional hydrosilation between the polysiloxane chain and desired alkene. Bulky cycloaliphatic pendant groups tend to increase the glass transition temperature, in comparison to methyl substituted polysiloxanes.

Tetramethylammonium hydroxide is chosen as a catalyst due to its basic amine groups in combination with its ease of removal via filtration. This catalyst also enables molecular weight control of the final product by allowing higher catalyst concentrations, and longer reaction times. Products made according to the process of the present invention can further contain thermal stability additives, or crosslinking agents, in epoxy resin systems.

The anionic polymerization process of the present invention makes it possible to prepare amino functional terminated polysiloxane chains because basic conditions do not affect the amine functional group. Preparation of such polysiloxanes is not possible by acid-induced polymerization processes due to protonation of the amine functional group.

In general, early in the anionic polymerization reaction, the forward reaction is predominant due to the over abundance of cyclic siloxanes. However, as the reaction continues, and the concentration of linear polysiloxanes increases, depolymerization and redistribution (i.e., back-biting) become more and more frequent. Ultimately, a dynamic equilibrium is established between the cyclic and linear forms, similar to that of cationicly induced polymerization.

The catalyst must be destroyed if the cyclic components are to be separated from the linear species by distillation. The catalyst can be destroyed by adding traces of acid or chlorosilanes thereby yielding polysiloxanes with organo-functional chain ends. Additionally, catalysts such as tetraalkylammonium and tetraalkylphosphonium hydroxides can be destroyed by vigorous heating. For example, tetramethylammonium hydroxide can be completely destroyed at 150° C., yielding trimethylamine and methoxy siloxanes.

Synthesis and Characterization:

A diagram showing the preparation of amine terminated cycloaliphatic substituted polysiloxane is presented in FIG. 2. Significantly, the cyclic oligomers are prepared such that they have a small amount of silane groups (R—Si—H) along the backbone. This prevents crystallization of the final polysiloxane product. Incorporation of hydrogens along the polymer backbone results in resistance to forming ordered polymer domains, which results in a relatively low-viscosity liquid polymer.

Synthesis of Amine Terminated poly(dicycloaliphaticsiloxane-co-cycloaliphatic-hydrosiloxane) by Base-Catalyzed Ring-Opening Reaction:

Tetramethylammonium hydroxide solution in methanol (25 wt %, 3 g, 0.033 mol) is added to a three neck round bottom flask, equipped with a reflux condenser and nitrogen inlet and outlet ports. The temperature is raised to about 100° C. to remove the solvent. After substantially removing the solvent, cyclic oligomers of either poly(dicyclopentylsiloxane-co-cyclopentylhydrosiloxane) or poly(dicyclohexyl-siloxane-co-cyclohexylhydrosiloxane) (about 30 g) are added to the reaction mixture. Additionally, 1,3-bis(3-aminopropyl) tetramethyldisiloxane (about 1.0 g, or 4.02 mmol), and toluene (about 10 g) are added. The reaction mixture is stirred at a temperature of about 50 to 100° C., or about 60 to 90° C. or, about 75 to 85° C., or even about 80° C. Furthermore, stirring is conducted under nitrogen for about 1 to 10 hours, or about 3 to 8 hours, or about 4 to 6 hours, or even about 5 hours. Here as elsewhere in the specification, ranges may be combined.

The temperature is raised to about 150° C. for about one hour, in order to deactivate the catalyst. The solution is then filtered to obtain amine terminated poly(dicycloaliphaticsiloxane-co-cycloaliphatichydrosiloxane) of various molecular weight ranges. Vacuum filtration is performed at about 100° C. and less than 1 mm Hg in order to remove low molecular weight oligomers and any unreacted starting material.

Number average molecular weights of the products are obtained using gel-permeation chromatography.

TABLE 1

| Compound | Mn (g/mol) | PDI | Amine equiv. wt (g/equiv) |
|---|---|---|---|
| Amine terminated poly(dicyclopentylsiloxane-co-cyclopentylhydrosiloxane) | 9,465 | 1.32 | 4,324 ± 23 |
| Amine terminated poly(dicyclohexylsiloxane-co-cyclohexylhydrosiloxane) | 8,532 | 1.53 | 4198 ± 23 |

The polymers are spectroscopically characterized using $^{29}$Si NMR, $^1$H NMR, and FT-IR with the following results:

TABLE 2

| Method | Characteristic Peaks |
|---|---|
| 1H NMR (δ (ppm), CDCl$_3$) | 4.53 (s, CH$_3$—Si—H), 1.24 (s, CH$_2$NH$_2$). |
| 29Si NMR (δ (ppm), TMS) | −38.19 (s, R—Si—H), 7.70 (s, R$_3$—Si—O). |
| FT-IR (cm-1-, KBr Plate) | 1625 (s, N—H), 2150 (s, Si—H), 3200-3400 (d, N—H). |

Figure 4:
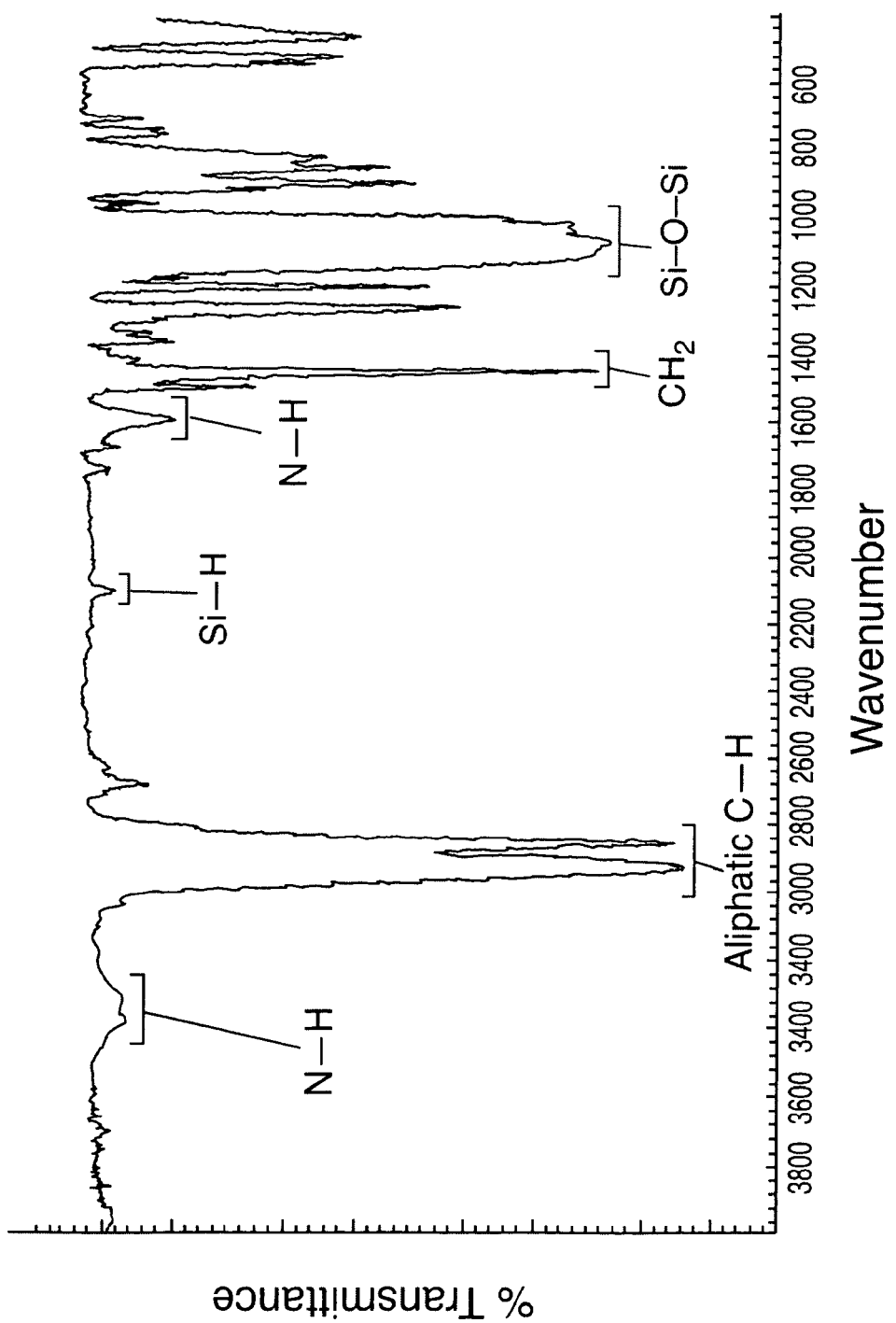
FIG. 4 is an FT-IR spectrum of an amine terminated poly(dicyclohexylsiloxane-co-cyclohexylhydrosiloxane)

The product's structure can be confirmed using Fourier transform infrared spectroscopy (FTIR) in conjunction with $^1$H and $^{29}$Si NMR. Fourier transform infrared spectroscopy confirms the presence of the amine functional group, and the presence of the Si—H group (see FIGS. 3 and 4). Additionally, FTIR reveals that both the cyclopentyl and cyclohexyl substituted polysiloxanes are functionalized with an amine group. This is apparent in FIGS. 3 and 4 because of the presence of a characteristic double peak at about 3300 cm$^{-1}$. This double peak correlates to the free asymmetric and symmetric N—H stretching modes. The presence of the amine group is further confirmed by the N—H bend at about 1640 cm$^{-1}$.

Peak broadening near 1100 cm$^{-1}$ is observed, which indicates low molecular weight polysiloxanes. As the siloxane chains become longer, the Si—O—Si absorption becomes broader and more complex, showing two or more overlapping bands. Further investigation of the FT-IR spectra reveals the Si—H peak at about 2100 cm$^{-1}$. Additionally, the existence of an amine functional group is evident from the FTIR spectrum.

Figure 5:
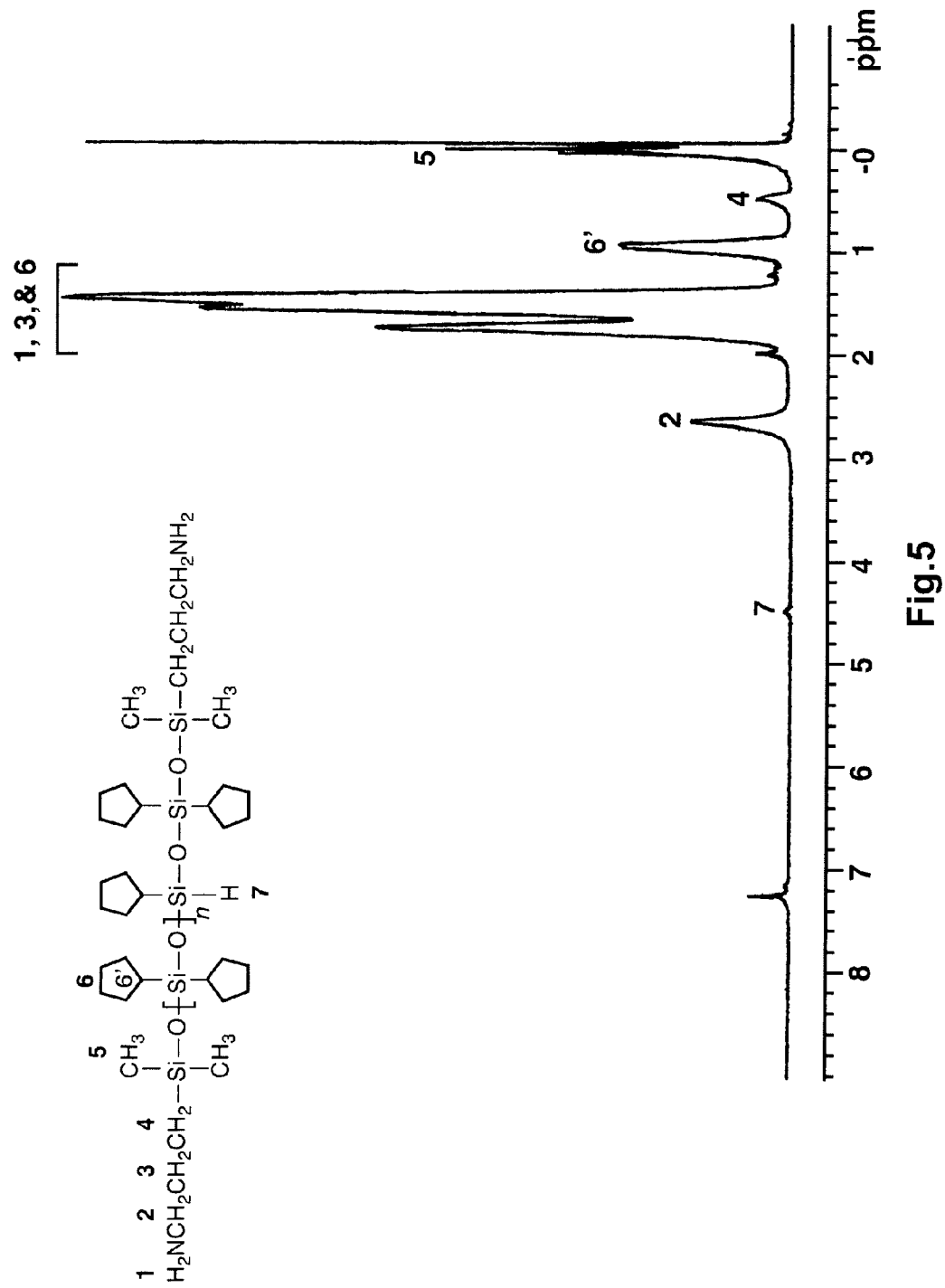
FIG. 5 is a $^1$H NMR spectrum of an amine terminated poly(dicyclopentyl-siloxane-co-cyclopentylhydrosiloxane)
Figure 6:
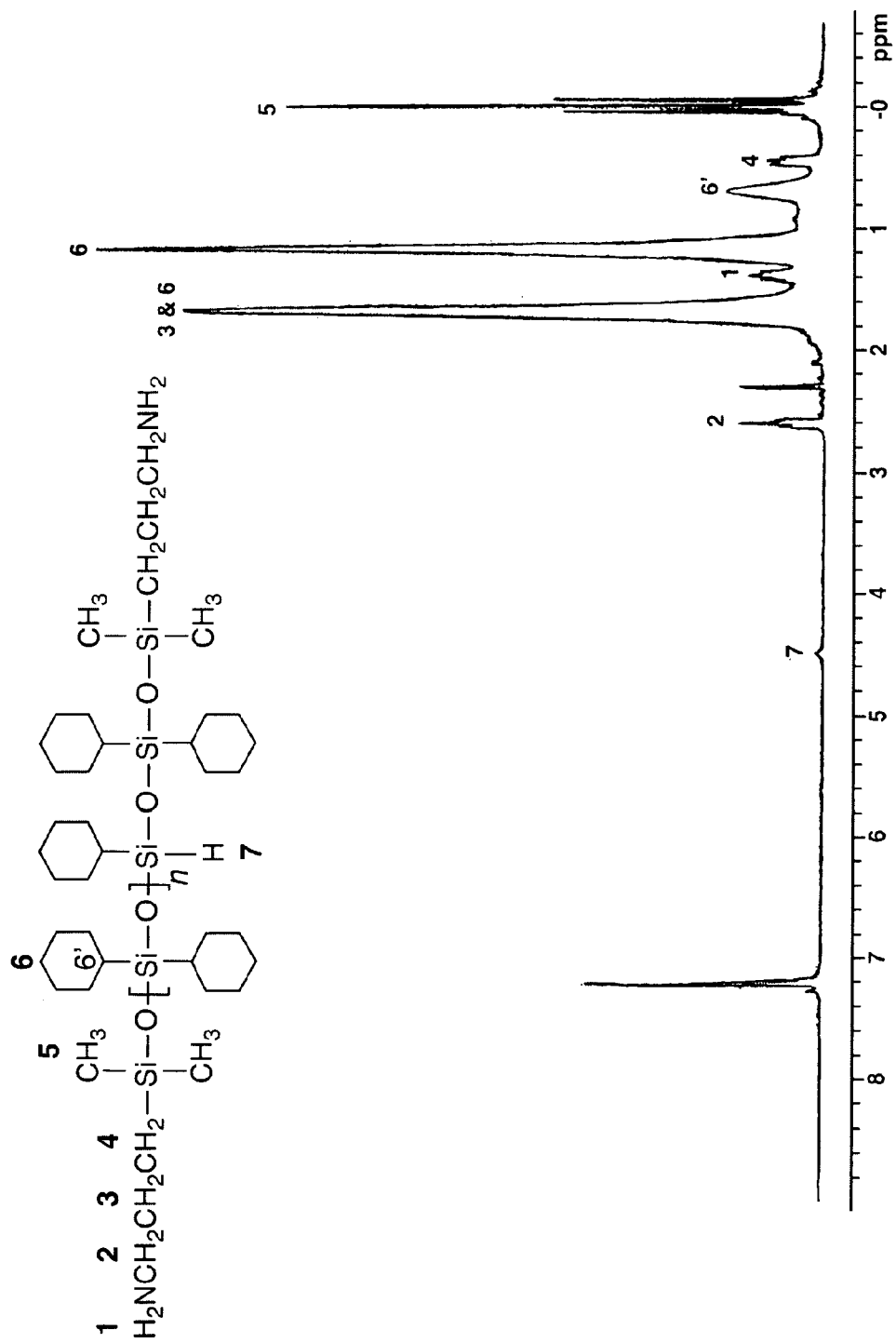
FIG. 6 is a $^1$H NMR spectrum of an amine terminated poly(dicyclohexyl-siloxane-co-cyclohexylhydrosiloxane)

The structure of the polysiloxane is further characterized by $^1$H NMR spectroscopy (see FIG. 5 and FIG. 6). The tetramethylsilane internal standard peak is shown at approximately δ 0.00 ppm in both FIGS. 5 and 6. FIG. 5 shows resonances at about δ 2.65 ppm and δ 0.57 ppm, which are representative of the propyl chain protons. The methyl group protons of the chain terminating 1,3-bis(3-aminopropyl)tetramethyldisiloxane are observed at about δ 0.04 ppm, and closer examination of this resonance region reveals a plurality of resonances. The splitting of the resonance at about δ 0.04 ppm is caused by the silicon atom of the dimethyl silicon moiety coupling with a silicon atom functionalized with a hydrogen atom. This indicates that some of the siloxane chains have a silicon atom with the substitution (C$_5$H$_9$—Si—

H) immediately following the terminal silicon atom. The Si—H proton is also observed at the expected region between about δ 3 and 6 ppm. The characteristic amine resonances at about δ 1.24 ppm are obscured by a strong signal from the cyclopentyl groups.

FIG. 6 shows the cyclohexyl substituents (δ 0.6-0.8, 1.00-1.18, and 1.59-1.82 ppm), amine protons (δ 1.24 ppm), and the propyl carbon protons (δ 0.41-0.52, 1.59-1.82, and 2.58-6.64 ppm). The $^1$H NMR identifies the functional groups and any impurities (residual catalyst, solvent, etc.) that my have been obscured by other bands in the FT-IR spectra, leading to a more detailed analysis. However, the structure of the polymer has yet to be determined.

Figure 7:
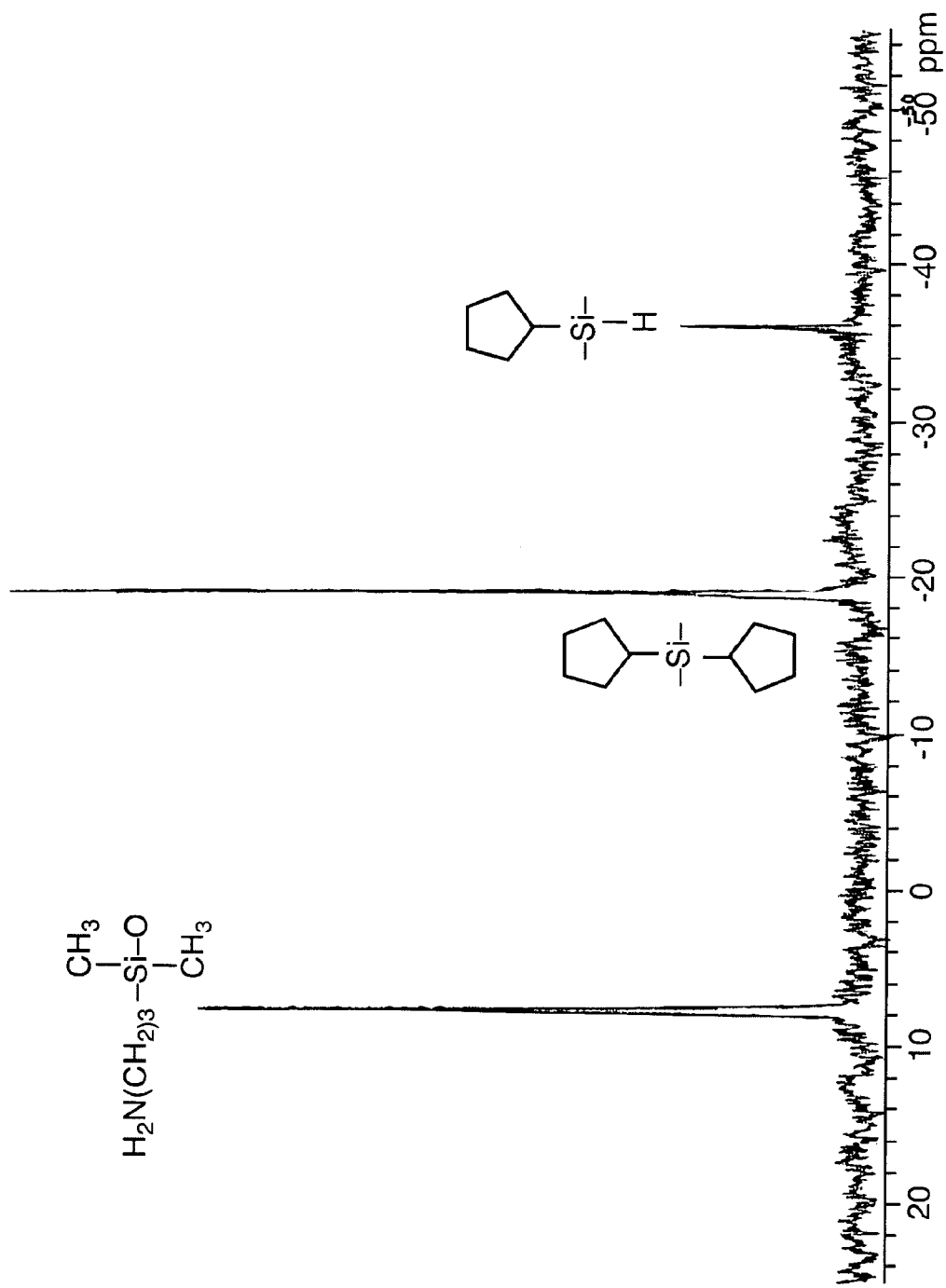
FIG. 7 is a $^{29}$Si NMR spectrum of an amine terminated poly(dicyclopentyl-siloxane-co-cyclopentylhydrosiloxane)
Figure 8:
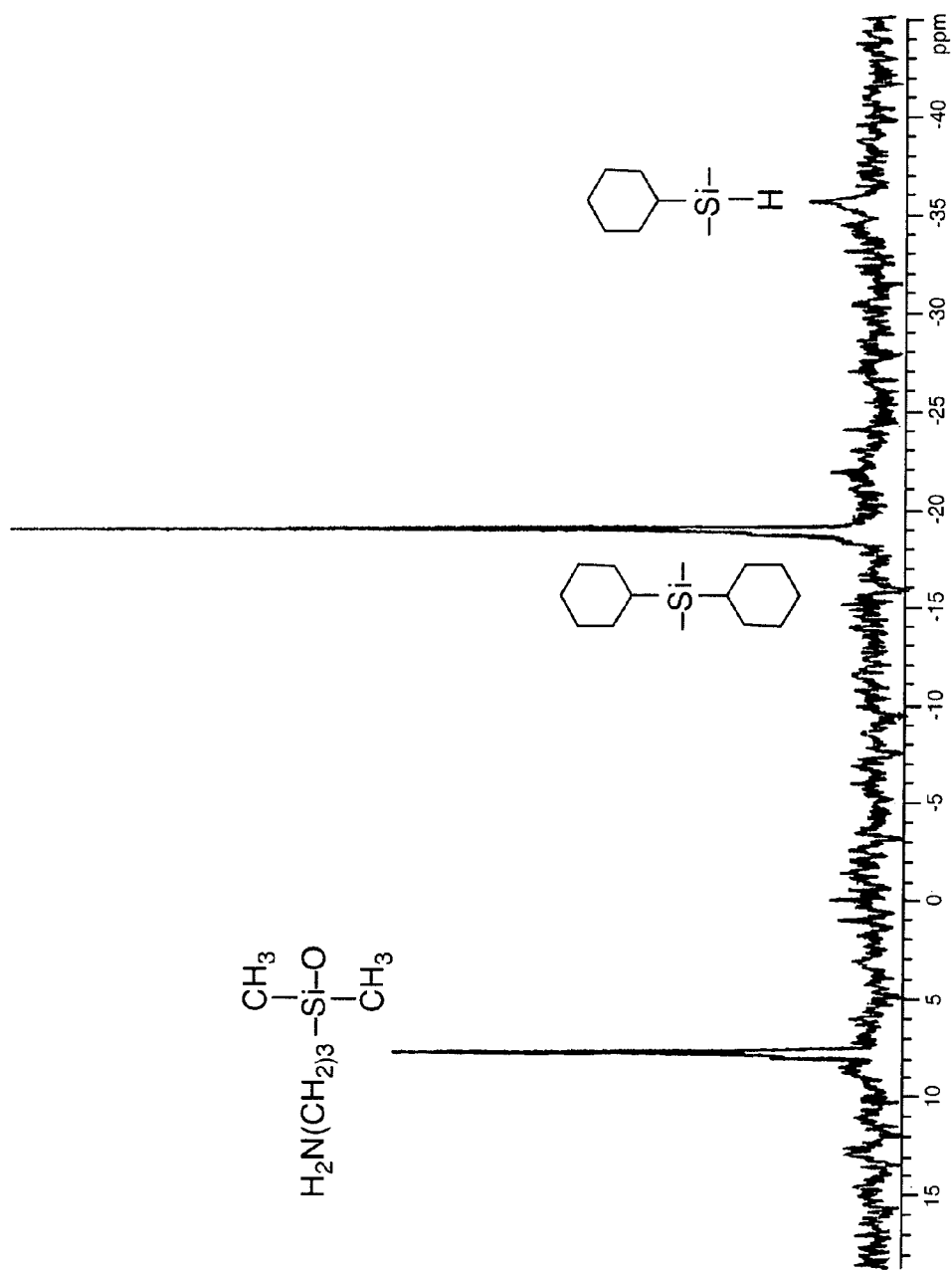
FIG. 8 is a $^{29}$Si NMR spectrum of an amine terminated poly(dicyclohexyl-siloxane-co-cyclohexylhydrosiloxane)

The polysiloxane structure is further analyzed by $^{29}$Si NMR (FIGS. 7 and 8). Specifically, $^{29}$Si NMR can identify monofunctional ($R_3$—SiO) and difunctional (—O—Si—O) silicon atoms. The spectra reveal three distinct peaks at δ 7.70, δ −19.10, and δ −38.19 ppm, respectively. The prominent peak at δ −19.10 ppm is indicative of linear chains. This shows that cycloaliphatic groups deshield the silicon nucleus and cause a downfield shift, when viewed in comparison to PDMS (about δ −21 ppm). The resonance for the hydrogen-substituted silicon atom is seen upfield at about δ −38.19 ppm. This upfield shift occurs because hydrogen increases the electron density around the silicon atom. The terminal silicon atom is also observed at δ 7.70. Notably, the spectra shown in FIGS. 7 and 8 do not show resonances at about δ −65 ppm and about δ −107 ppm. This indicates that the polymer backbone linear.

Figure 9:
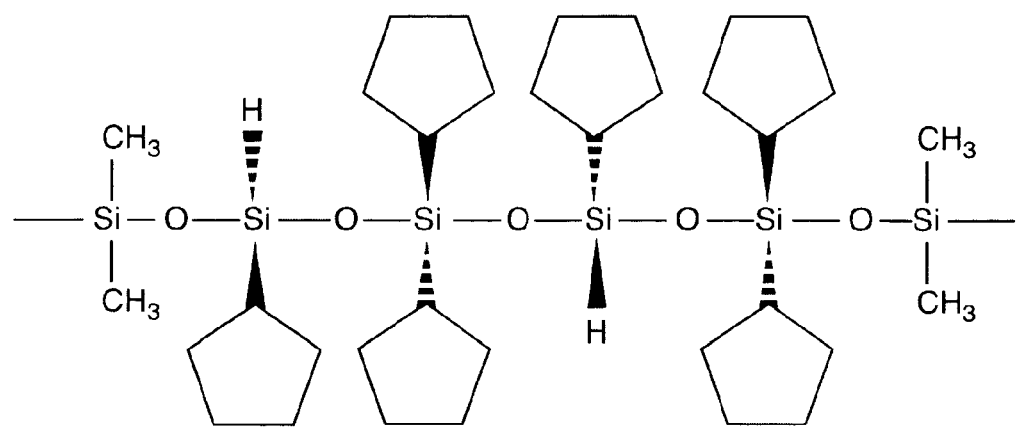
FIG. 9 is a chemical drawing showing of some possible stereoisomers about silicon atom centers.

Closer examination of the three peaks shown in FIGS. 7 and 8 reveal a splitting pattern. This is attributed to the various stereoisomers, which are shown in FIG. 9. Each of the various configurations yields different microenvironments for each silicon atom, which results in splitting the signal into a doublet or triplet. These splitting patterns have been observed in poly(methylhydrogensiloxane) with a degree of polymerization of about 50.

Mechanical and Physical Properties:

Polymer blends are prepared for testing from cycloaliphatic epoxy functionalized cycloaliphatic substituted polysiloxane. The cyclopentyl substituted epoxy equivalent weight is about 236±3 g/equiv, and the cyclohexyl substituted epoxy equivalent weight is about 265±3 g/equiv. The glass transition temperature ($T_g$) of the material is measured and the mechanical properties are evaluated as shown in Table 3 below. Thermal analysis revealed that the presence of cycloaliphatic groups dramatically increases the glass transition temperature of the material when compared to PDMS ($T_g$ of about −127° C.). This is due to the rigid cycloaliphatic groups hindering the polysiloxanes flexibility. The mechanical properties (Table 3) reveal that the change in adhesion towards the aluminum substrate, flexibility, and durability of the polymer are appreciable as compared to PDMS.

TABLE 3

| Substituent | Reverse Impact (in-lbs) | Taber Abrasion (cycles/mil) | Pull-Off Adhesion (MPa) | $T_g$ (° C.) |
|---|---|---|---|---|
| Cyclopentyl | 4 | 853 | 0.5 | 29.5 ± 0.7 |
| Cyclohexyl | 5 | 819 | 0.5 | 38.6 ± 0.7 |

The lack of flexibility is attributed to the relatively high $T_g$ of the polymers, which is due to the cycloaliphatic groups inhibiting motion of the polymer chain. The $T_g$ of the films imparts a semi-durable property to the material. The low pull-off adhesion values are expected for polysiloxanes due to the low surface tension of the material. The adhesive bond strength between a substrate and a film is a strong function of the difference between the surface tension of the film and that of the substrate. If the surface tension of the liquid film precursor is greater than that of the substrate then the precursor will not spread out and form a film. As the precursor's surface energy increases the precursor eventually spreads out and forms a film. However, when the film dries it has poor adhesion. The surface tension of pure PDMS is about 20 mN/m while that of aluminum is about 40 mN/m. This difference of 20 mN/m should be enough to allow the film to wet the substrate.

Film Preparation and Mechanical Testing:

Aluminum and glass panels were used as substrates for film preparation. The coating formulations were made by taking the synthesized glycidyl epoxide functional polysiloxane and HELOXY Modifier 48 in a glass vial and adding 0.1 wt % by weight acetic acid, then mixing thoroughly for 20-30 min at room temperature. Then, the amine functionalized polysiloxane and Epicure 9551 were added to the glass vial and mixed again for about 15 minutes. The amount of the four components used is shown in Table 4. The thermally cured systems are abbreviated as MS-Ep-NH (polydimethylsiloxane epoxide and polydimethylsiloxane amine), PS-Ep-NH (polydicyclopentylsiloxane epoxide and polydicyclopentylsiloxane amine) and HS-Ep-NH (polydicyclohexylsiloxane epoxide and polydicyclohexylsiloxane amine). The films were cast on the substrates with a thickness of 200 μm (8 mil) by a drawdown bar. The films were cured at 120° C. for 6 hours and stored in a dust free cabinet for testing purposes.

TABLE 4

Components of thermal curable film formation

| | Glycidyl Epoxide Polysiloxane | Heloxy Modifier 48 | Amino Polysiloxane | Epicure 9551 |
|---|---|---|---|---|
| MS-Ep-NH | 2.5 g, 0.0123 mol * | 2.6 g 0.018 mol * | 10.32 g 0.02 mol * | 1.2 g 0.01 mol $^x$ |
| PS-Ep-NH | 10 g 0.0126 mol * | 2.6 g 0.018 mol * | 8 g 0.02 mol * | 1.2 g 0.01 mol $^x$ |
| HS-Ep-NH | 10 g 0.0122 mol * | 2.6 g 0.018 mol * | 8 g 0.02 mol * | 1.2 g 0.01 mol $^x$ |

Note:
* represents mol of epoxide group
$^x$ represents mol of amine group

Cured Film Characterization:

Coating Properties:

After thermal curing, the general coating properties of the aliphatic amine-functionalized polysiloxane were evaluated. The pencil hardness (ASTM D3363-74), reverse impact resistance (ASTM D 2794-84), crosshatch adhesion (ASTM D3359-87), pull off adhesion (ASTM D 4541-02), and tensile properties (ASTM D 2370-92) were measured according to ASTM standards.

Dynamic Mechanical Thermal Analysis (DMTA):

The visco-elastic properties of the siloxane films were investigated with a dynamic mechanical thermal analyzer in a compression mode at the frequency of 1 Hz and a heating rate of 2° C./min over a range of −160 to 150° C. The testing conditions and methodology were performed according to ASTM D 4065-95. The samples were cut into 4 mm squares with an average thickness of 0.75 mm. A minimum preload force of 200 mN was applied by the instrument. For each formulation, 4 replicates were tested. The cross-link density ($v_e$) of the films were determined through the elastic modulus in the rubbery plateau region. The relationship between rubbery plateau modulus and cross-link density is:

$$\nu_e = \frac{E'_{min}}{3RT}$$

where $\nu_e$ is the cross-link density of elastically effective network chains, $E'_{min}$ is the minimum value of the storage modulus (Pa) above the glass transition temperature ($T_g$), R is the gas constant (J/K mol) and T is the absolute temperature (T>>$T_g$) in Kelvin. At the temperature much below $T_g$, loss modulus (E") is very low, therefore modulus (E) is approximately equal to storage modulus (E'). The $T_g$ of the specimens was considered to be the peak point of the loss modulus (E") signal. Determination of $\nu_e$ can be performed by defining it in terms of moles of network chains per $cm^3$ sample.

One of the target usages of the thermal curable siloxanes are for release coatings. The degree of cure as determined by MEK double rubs of silicone-epoxide/silicone-amine were used to optimally choose the catalyst for silicone-epoxide/silicone-amine curing. When silicone-epoxide resins were cured with the silicone-amine, very soft films were obtained. To obtain continuous films for mechanical and coating testings, HELOXY MODIFIER 48 and Epicure 9551 were added as reactive diluents in film formulations. The amount of reactive diluents was however, minimized to ensure that it did not dominate the end properties of the siloxane films.

The thermal curing of glycidyl epoxide and amine system were observed through DSC. Each of the siloxane systems showed exothermic cure curve as shown in FIG. 5. This thermogram is similar and representative of the other two systems (methyl and cyclohexyl siloxanes). The heat of reaction is given in Table 5. The heat of curing reaction was determined for epoxide amine systems with and without reactive diluents. The heat of reaction for the combination of the siloxanes and reactive diluents are much higher than cured siloxane systems alone. Not surprisingly, the reactive diluents being small molecules aided in the completeness of the cure. Consequently, films for characterizations were formed by curing siloxane with reactive diluents to obtain representative mechanical properties.

TABLE 5

Heat of Curing for Polysiloxanes and Reactive Diluents

| Sample Name | Cured Composition | Heat (J/g) |
|---|---|---|
| PDMS | Polydimethylsiloxane amine | 251.4 |
| PDPS | Polydicyclopentylsiloxane amine | 97.4 |
| PDHS | Polydicyclohexylsiloxane amine | 127.4 |
| Reactive Diluents | Heloxy 48 + Epicure 9551 | 208.8 |
| PDMS + Reactive Diluents | Polydimethylsiloxane amine Heloxy 48 Epicure 9551 | 562.2 |
| PDPS + Reactive Diluents | Polydicyclopentylsiloxane amine Heloxy 48 Epicure 9551 | 277.5 |
| PDHS + Reactive Diluents | Polydicyclohexylsiloxane amine Heloxy 48 Epicure 9551 | 285.4 |

Tensile Properties:

Tensile measurements were made on rectangular specimens 15 mm wide, 0.09-0.14 mm thick and with gauge length of 60 mm. A crosshead speed of 2.0 mm/min was applied to determine the tensile strength, elongation at break and tensile modulus. For each film, five samples were tested, and the average is reported.

Fracture Toughness:

Plane-stress fracture toughness ($K_{IC}$) measurements were conducted on rectangular specimens with single edge notch geometry. The dimensions of the films were 60 mm×15 mm×0.09-0.14 mm (length×width×thickness). Each film was cut with a razor blade to create a notch at approximately half the length of the specimen. The notch length was approximately 10% of the sample width. The fracture toughness equipment was mounted on a microscope stage and equipped with a 25 lbf load cell and a variable speed motor. Crosshead speed of 5 mm/min was used to deform the specimen in tensile mode. The computer digitally recorded variation of load versus displacement. The crack tip region was on the computer screen at the magnification of 10× and the onset of propagation was marked on the load-displacement curve. Six samples were tested for each film. The mean value was reported. The plane stress fracture toughness ($K_{IC}$) is given by the equation[1]:

$$K_{IC} = \left[3.94\left(\frac{2w}{\pi a}\right)\tan\left(\frac{\pi a}{2w}\right)\right]^{1/2}\frac{F}{(w-a)b}\sqrt{a}$$

where w is the sample width in cm, a is the notch length in cm, b is the thickness in cm, F is the force on sample at which crack propagation begins measured in newtons. The energy release rate per unit of crack area at fracture ($G_{IC}$) was calculated with the following equation:

$$G_{IC} = \frac{K_{IC}^2}{E}$$

where E is the tensile modulus. The $G_{IC}$ values were calculated with average values of $K_{IC}$ and E.

The tensile strength, elongation-at-break, and tensile modulus of the thermally cured films are given in Table 6. The tensile strength of the cyclohexyl siloxane system was highest at 5.4 MPa, more than 5 times more than the methyl substituted siloxane system. Tensile modulus of the cyclohexyl system was 2.5 times more than the methyl substituted siloxane at 187 MPa. The elongation-to-break (%) of methyl siloxane was 9%, six times higher than the cyclohexyl siloxane system. It was observed that as the bulk of the pendant group increases, the tensile modulus and strength was increased and the elongation-at-break decreased.

TABLE 6

The Mechanical Properties of Thermally Cured Siloxanes

| | MS-Ep-NH | PS-Ep-NH | HS-Ep-NH |
|---|---|---|---|
| Tensile Modulus (MPa) | 73 ± 1.68 | 156 ± 2.15 | 187 ± 2.02 |
| Tensile Strength (MPa) | 0.79 ± 0.05 | 4.8 ± 0.4 | 5.4 ± 0.15 |
| Elongation-to-break (%) | 1.8 ± 0.87 | 0.4 ± 0.07 | 0.3 ± 0.04 |
| $u_e$ (mol/$m^3$) | 2935 | 228 | 115 |
| $K_c$ [MPa·$m^{1/2}$] | 0.07 ± 0.01 | 0.15 ± 0.05 | 0.26 ± 0.06 |
| $G_{IC}$ (J $m^{-2}$) | 67.12 ± 5.6 | 144.2 ± 9.2 | 361.5 ± 15.4 |

The general film properties for the three thermally cured systems are summarized in Table 7. Usually, the larger the organic substituents on the siloxane backbone, lower release properties are observed, thereby improving the adhesion of PSAs. As the pendant group in the silicone backbone was varied from methyl to cyclopentyl to cyclohexyl, the backbone became more rigid. Hence, the segmental mobility reduced, resulting in a denser network. Re-adhesion values are shown to increase significantly for all systems.

TABLE 7

Coating Properties of Thermally Cured PDMS, PDPS and PDHS

| | | MS-Ep-NH | PS-Ep-NH | HS-Ep-NH |
|---|---|---|---|---|
| Release | Adhesion | 40 ± 7.5 | 120 ± 3.69 | 130 ± 4.99 |
| Force (N/m) | Readhesion | 60 ± 6.78 | 160 ± 4.03 | 220 ± 9.13 |
| Pencil Hardness | | B | 2 H | 2 H |
| Cross-hatch adhesion | | B | 4 B | 4 B |
| Pull-Off Adhesion | | 0.375 | 0.5 | 0.5 |
| MEK resistance | | 20 ± 1.29 | 40 ± 2.9 | 45 ± 0.82 |
| Impact | Direct | >40 | >40 | >40 |
| Resistance (lb/in) | Reverse | 10 ± 0.5 | 25 ± 1.26 | 30 ± 1.7 |
| Contact | Advancing | 90° ± 0.75 | 104° ± 0.40 | 115° ± 0.31 |
| Angle | Receding | 70° ± 2.08 | 77° ± 2.52 | 90° ± 4.44 |
| $O_2$ Permeability | | 0.022 ± 0.004 | 0.098 ± 0.01 | 0.625 ± 0.07 |

Pencil hardness of a cured film is related to the elongation-at-break, i.e. the coating is broken only when the maximum stress due to the pencil or indenter scratching the surface exceeds the tensile strength of the coating film. Therefore, the pencil hardness shows the same trend as the tensile properties. With increase in substituent size, the pull-off adhesion is increased. This may be attributed to increase in toughness.

The falling weight impact test was performed to determine the ability of the coating to resist damage caused by rapid deformation (impact). The resistance of the coating to the penetration by the falling weight is directly proportional to strength of the coating matrices. In this case, both for reverse and direct impact testing, energy that the coating can withstand increased with increase in bulkiness of the pendant group attached to the silicone backbone. Impact resistance was found to be directly proportional to the fracture toughness. A high value of fracture toughness and impact resistance in the absence of crack, is the reflection of good resistance to crack initiation and crack propagation. It was found that as the bulkiness of the pendant group in the silicone backbone increased, the adhesion strength, and MEK resistance increased, and crosslink density decreased. Crosshatch adhesion values of thermally cured PDPD and PDHS were observed to be much higher than the PDMS system.

Figure 10:
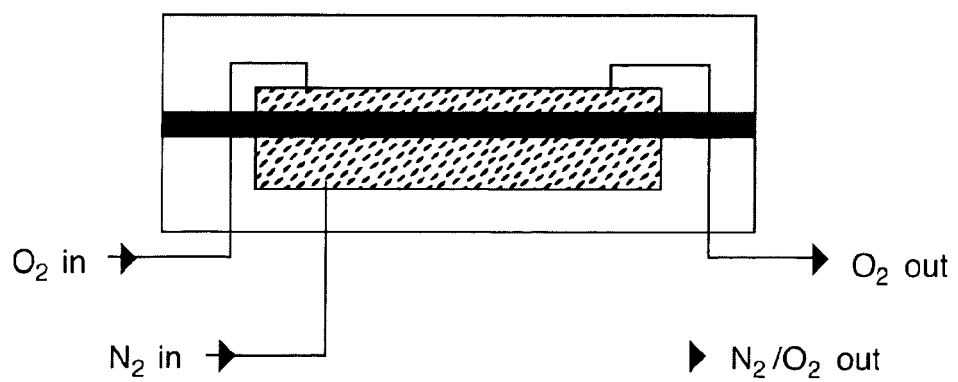
FIG. 10 is a diagram of a sample chamber used to test permeability of a film according to the invention.
Figure 11:
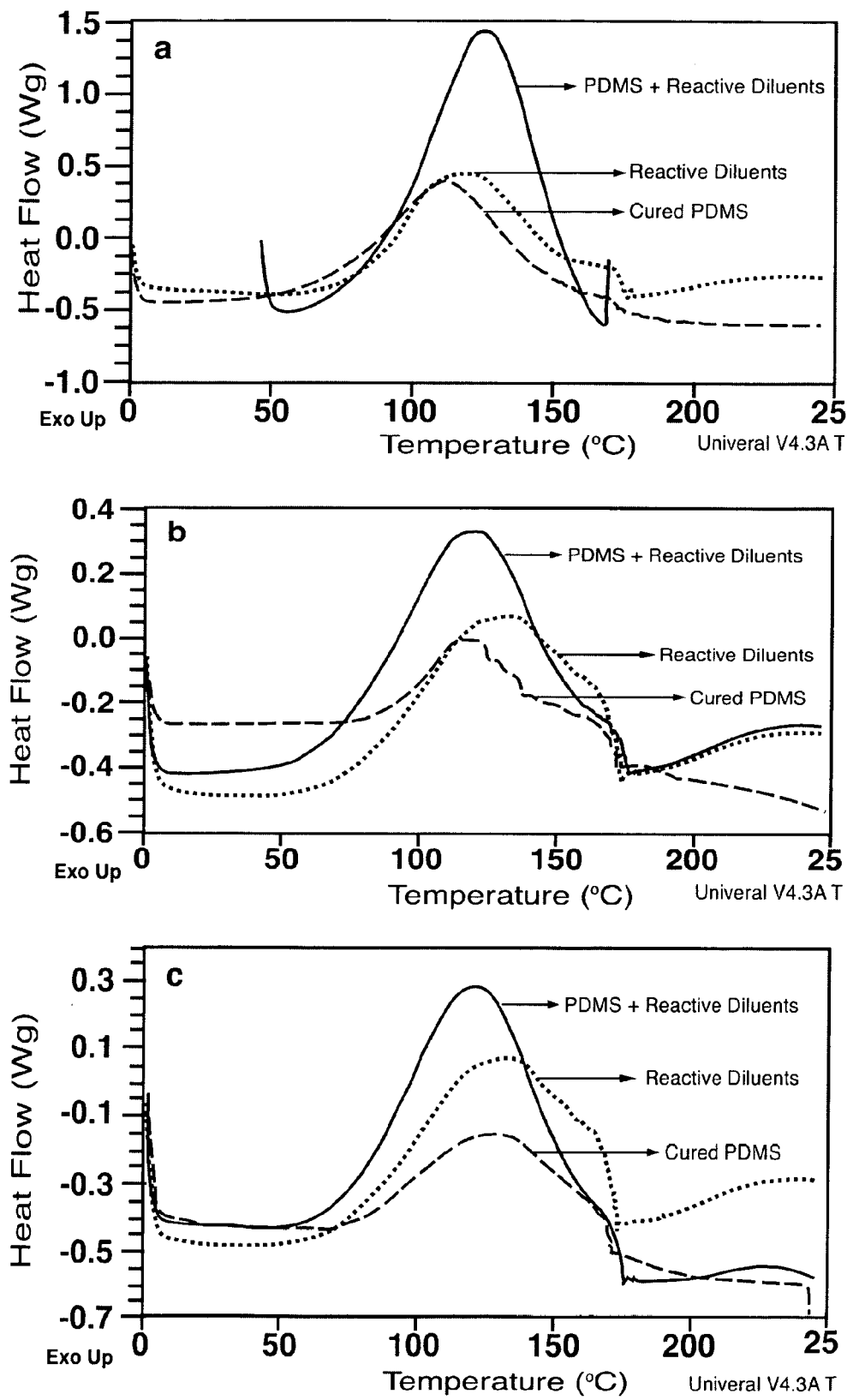
FIG. 11(a)-(c) are graphs of the curing exotherm of (a) telechelic epoxide and amine Polydimethylsiloxane (PDMS), reactive diluents, and cured siloxane with reactive diluents; (b) telechelic epoxide and amine Polydicyclopentylsiloxane (PDPS), reactive diluents, and cured siloxane with reactive diluents; and (c) telechelic epoxide and amine Polydicyclohexylsiloxane (PDHS), reactive diluents, and cured siloxane with reactive diluents.

Oxygen Permeability:

Oxygen permeation analysis was performed to provide accurate measurements of oxygen permeation rates (OTR) through flat films and packages. Flat film samples were clamped in a diffusion chamber and pure $O_2$ was introduced into the upper half of the chamber while an oxygen free carrier gas flowed through the lower half, as shown in FIG. 10. Molecules of oxygen diffusing through the film into the lower chamber were conveyed to the sensor by the carrier gas. This allowed a direct measurement of the oxygen without using complex extrapolations. The OTR rate of the test film was displayed either as cc/100 in$^2$/day or cc/m$^2$/day.

With reference back to Table 7, oxygen permeability values were found to increase with increase in the bulk of the pendant group. This was due to the fact that as the steric bulk of the organic groups attached to the silicone backbone increases, the sites of cross-linking become further apart. As the free volume of the cured polymer matrix increased, the oxygen transmission rate rose.

Contact Angle Measurement:

Contact angle measurements were performed with a Rame-Hart contact angle goniometer, model 100-00 using deionized water. Images of advancing and receding angles were taken using image-capturing equipment (Dazzle DVC, Dazzle media). Contact angle on both sides of the droplet were measured using Scion Image at ambient conditions (1 atm, ~25° C.). Five measurements were taken for each sample and an average value of all the contact angles is reported.

With reference to Table 7, it is shown that both the advancing and receding contact angles increased with the increase in hydrophobicity of the thermally cured siloxane layer on the silicone wafer. The methyl substituted siloxane is the least hydrophobic and cyclohexyl substituted siloxane is the most hydrophobic.

Release Testing by POA:

In order to measure adhesion of the film to the Al plates, the silicone amine formulations were prepared as given in Table 4. The formulations were cast on Al plates and cured thermally at 120° C., and then the Scotch Tape 249 was applied on the coated substrate. A 1 lb load was rolled over the plate 5 times to ensure adhesion. The release force of the tape from the cured silicone layer was measured at 180° peeling angle using a tensile tester. After the tape was removed from the silicone layer, subsequent adhesion was determined by reapplying the tape to a clean steel panel, rolling the panel 5 times with a 1 lb load, and again measuring the force required to remove the tape at an angle of 180°. The release energy (G) is given by:

$$G = \frac{F}{b}(1 - \cos\theta)$$

where F is steady-state peel load, b is the width of scotch tape and θ is the peel angle. A minimum of five trials was conducted on each sample and the mean is reported in Table 7.

Wide Angle X-Ray Diffraction (WAXD):

WAXD of thermally cured siloxane films were taken using a Bruker X-Ray diffractometer at a wavelength (λ) of 0.154 nm with tube voltage of 40 kV and tube current of 40 mA. A scanning range of 2θ from 5° to 30° with scanning interval of 0.05° was used.

Figure 12:
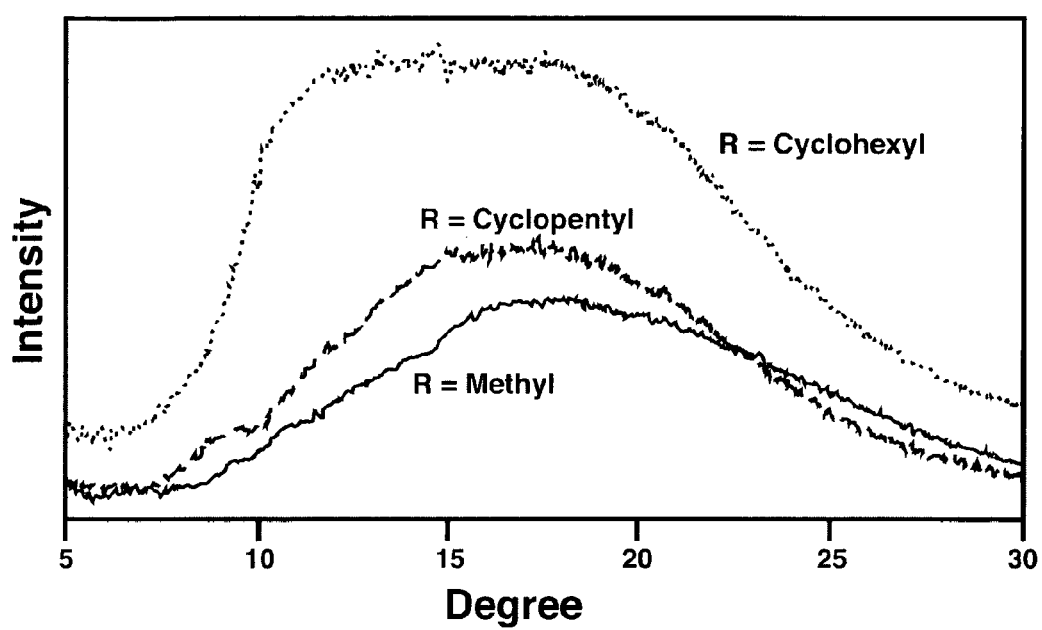
FIG. 12 is a WAXD spectrum of thermally cured siloxanes according to the invention.

The X-ray diffraction pattern of the three thermally cured siloxanes is shown in FIG. 12. All of the samples exhibit a broad peak indicating the amorphous nature of these samples. The d-spacing in the diffraction pattern, which characterizes the chain-to-chain distance in the polymer matrix was calculated using Bragg's equation as shown below:

$$n\lambda = 2d \sin\theta$$

where θ is the angle of maximum intensity of the peak observed in the sample spectrum and λ is the wavelength of the X-ray radiation. As the bulkiness of the pendant group on the siloxane main chain is increased, the peak intensity is found to decrease. There is a small shift in the peak position, as the pendant group varies from methyl (2θ=17.7°, d-spacing value of 2.5 Å°), to cyclopentyl (2θ=16.6°, d-spacing value of 2.7 Å°), to cyclohexyl (2θ=15.45°, d-spacing value of 2.9 Å°). The broadness is most likely an overlap of unreacted oligomers and the lack of packing of the cycloaliphatic substituents. The increase in d spacing supports the DMTA and oxygen permeability results that as the steric bulk of pendant group in the siloxane backbone increases the cross-link density decreases, oxygen permeability increases and polymer chain-to-chain distance within the polymer matrix increases.

Hydrosilation Synthesis Reaction with Blocked and Unblocked Amines

Figure 13:
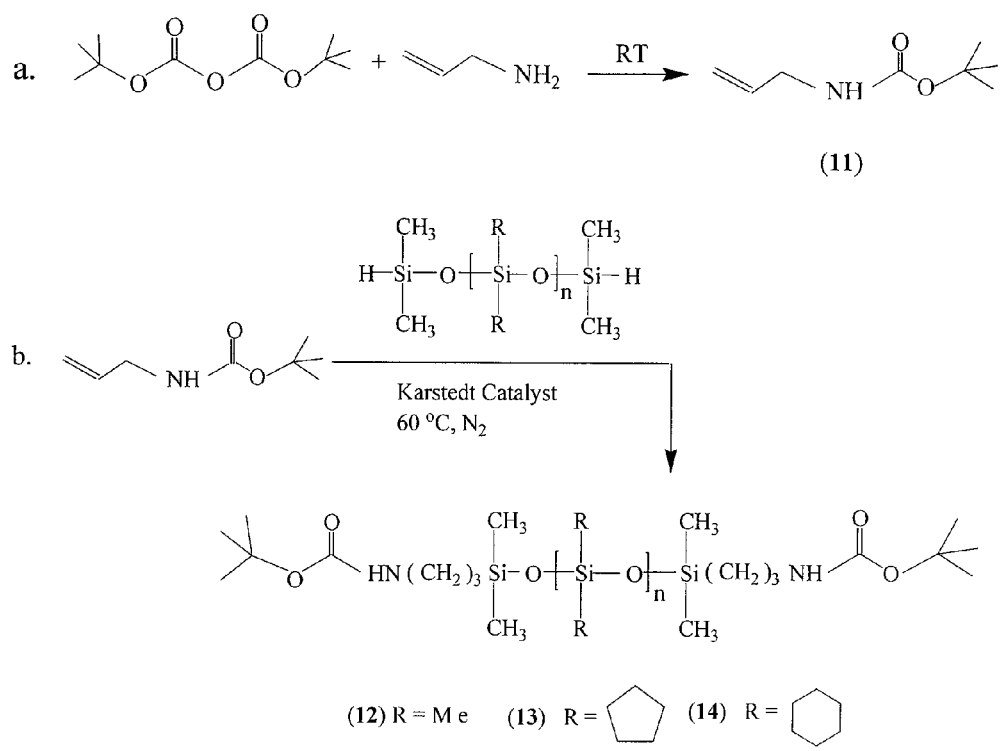
FIG. 13 is a reaction scheme showing formation of amine terminated cyclo=-aliphatic substituted polysiloxanes.

As an alternative to the preceding reaction scheme, in another embodiment of the invention, cyclopentene and cyclohexene substituted dichlorosilane were synthesized and used for making cyclic oligomers i.e. cyclic dicyclopentyl siloxane and cyclic dicyclohexyl siloxane through hydrolytic condensation, i.e., hydrosilation. Aliphatic amine functional siloxane was obtained by hydrosilation of hydride terminated dicyclopentyl siloxane and dicyclohexyl siloxane with t-butoxycarbonyl protected allylamine, followed by deprotecting the t-butoxycarbonyl group, according to the reaction scheme shown in FIG. 13. The functionalized siloxanes were characterization via infrared IR, $^1$H-NMR, $^{13}$C-NMR, $^{29}$Si-NMR and GPC. $T_g$ of the amino siloxane samples were observed by Differencial Scanning calorimetry (DSC). The resulting data was consistent with that reported above for the reaction scheme shown in FIG. 2.

Synthesis of Amine-Terminated PDPS and PDHS by Hydrosilation with Blocked and then Unblocked t-BOC Amine:

A 125 mL flask was charged with Hidride-terminated PDPS or PDHS and 2 μL of 3 wt % solution of platinum(0)-1,3-divinyl-1,1,3,3-tetramethyl disiloxane in xylenes. BOC-protected allylamine was dissolved in THF and slowly added to the reaction mixture. Upon completion of the reaction, the temperature was raised to 60° C. Solvents and excess BOC were removed by acetonitrile extraction and vacuum filtration. Deprotection of the t-BOC group was affected by adding the pentyl or hexyl polymer into 60 mL of DCM and mixing for 15 minutes under ice-cooled conditions. Next, 10 mL of TFA was added dropwise and the reaction allowed to continue for 30 minutes. The ice bath was removed and the reaction continued for 24 hours at room temperature. The reaction mixture was neutralized with cold super saturated sodium bicarbonate, followed by extraction with distilled water (2-3×, 300 mL). The organic layer was separated and anhydrous sodium sulfate was added and filtered off. Finally, the DCM was removed to yield either amino-terminated PDPS or amino-terminated PDHS.

Aliphatic amine functionality was introduced into the siloxane moiety by hydrosilation of hydride functional siloxane with t-BOC protected allylamine to yield compounds for thermal curable applications. The schematic representation of the three step synthesis is given in the reaction scheme set forth as FIG. 13. This reaction scheme solves catalyst poisoning problems known to plague platinum catalyzed addition cure systems in the presence of amine systems. The known systems have been prone to producing hydrogen gas as a by-product during the cross-linking reaction, resulting in the unintentional entrapment of gas bubbles within the cross-linked matrix produced. Thus, direct hydrosilation of unsaturated compounds containing primary amines is difficult. The use of primary amines according to the invention, however, avoids this problem by providing for blocking and then deblocking the added allylamine, avoiding side reactions and reducing the potential of catalyst poisoning. There are two advantages of blocking with a t-BOC group. One, it is possible to de-block, even in the presence of other acid sensitive functionalities, such as t-butyl esters and trityl (triphenyl methyl) groups. Second, unlike other carbonyl groups, t-BOC groups are essentially inert to Si—H bonds.

According to the invention, deblocking of the t-BOC group was afforded by using trifluoroacetic acid (TFA), and $CH_2Cl_2$, followed by neutralization with sodium bicarbonate. The neutralization step removes the TFA, which could otherwise lead to the formation of trifluoroacetamides in the presence of a later added coupling agent.

Spectroscopic Characterization:

The cyclic oligomers of poly(dicyclopentyl)siloxane (PDPS) and poly(dicyclohexyl)siloxane (PDHS) produced by reaction scheme 2 (FIG. 13) are clear yellow oily liquids. These products present spectral data consistent with that established for the product of reaction scheme 1. As such, the spectrograms are not included herein, but rather are discussed, identifying the characterizing peaks and resonances. The FTIR stretchings of cyclic PDPS are: 1010-1147 (Si—O—Si), 2848-2942 (—$CH_2$—), 2929-2980 (—$CH_3$—). The stretching at 1010-1147 cm$^{-1}$ is due to the siloxane (Si—O—Si) bond, at 2848-2980 cm$^{-1}$ is due to the C—H alkylene group of the cycloaliphatic moiety, and at 2929-2980 cm$^{-1}$ is due to the C—H stretch of a methyl group. The FTIR of cyclic PDHS showed similar spectra.

The Si-NMR of the cyclic oligomers show three sets of resonances. The resonance at ~25 ppm corresponds to siloxy units attached to the two tertiary carbons of the cyclopentyl group (C—Si—C). Partial hydrosilation occurs as a side reaction giving rise to mono substituted product, e.g poly(cyclopentyl)siloxane, having resonance at δ −32 ppm. Separation of partially unreacted siloxanes becomes difficult so a resonance appears at δ 32 ppm.

In the FTIR, the characteristic vibration stretch of primary amine can be observed as a broad band at 3200-3400 cm$^{-1}$.

In the $^1$H-NMR spectra, the proton resonance of the amine appears at δ 5.4-5.6 ppm., methyl resonance appears at δ 0.1 ppm., and methylene $CH_2$ resonances of the cycloaliphatic group occurs between δ 1.0-1.2 ppm. The resonances due to propyl chain proton and alkyne hydrogen of the cycloaliphatic group appears between δ 1.3-2.0 ppm. The integration ratio of 2 protons of $CH_2NH_2$ unit at 2.48 ppm to 2 protons of $Si(CH_3)CH_2$ at 0.75 ppm is 0.67. This gives the functionality of the amine group of about 67%. The rest of the functionality may be attributed to the presence of the hydroxyl group.

The $^{13}$C-NMR spectra shows the characteristic carbon resonance connected to terminal amine is at δ 42 ppm. The resonance at δ 0 ppm is the carbon of methyl group. The resonances at δ 10 and 22 ppm are due to the carbon of methylene group of the cyclopentyl ring. The tertiary carbon resonance is around δ 42 ppm. The resonances between δ 28 to 32 ppm are due to three methylene groups of propyl amine. The $^{29}$Si-NMR shows a resonance at δ −22 ppm due to the Si atom in the —O—Si—O— group attached to two tertiary carbons. The partial hydrosilation byproduct, having one tertiary carbon and a hydrogen attached to a —O—Si—O—, gives a resonance at δ 22.5 ppm. The resonance at δ 7.5 ppm is due to the —$CH_2$—Si—O— group.

Methyl and phenyl substituted siloxanes comprise the majority of silicones used as additives in industries, as a result of which the properties are at the extremes in terms of flexibility or glass transition temperature. Cyclo-aliphatic silicones have better resistance and weathering properties than resins containing aromatic groups. Hydrophobicity, or wetting properties, can be varied by different substitution on the cyclo-aliphatic group. Therefore, silation with bulky groups is important in the making of many bio-macromolecules.

The siloxane alkoxylates modified with an amino group at the terminal position have the potential to enhance the efficacy of agrochemicals on plants, as compared to conventional trisiloxane alkoxylates (TSE) alone. Amino siloxane oligomers are also suitable for covalent coupling to a bio-affinity adsorbent, as compatibilizers, in the cosmetic industry and in microlithography. Due to sensitivity to water, oligomeric siloxanes cannot be used in conventional water-based coatings, however, introduction of amino groups allows products to be produced which are emulsions. Siloxane diamines according to the invention form block copolymers having both thermally stable units along the backbone as well as siloxane units. These polymers have long term stability at temperatures above 200° C., but still exhibit a low $T_g$.

As has been shown, the introduction of epoxy groups on to siloxane polymers has a wide range of applications. The epoxy resins have excellent mechanical, electrical and adhesion properties, providing high performance thermosetting materials in many industrial fields. The desirable properties of epoxy functional siloxane resins, which makes them attractive to coatings, adhesives, paper release agents, additives for printing inks and other uses, are low viscosity, excellent clarity, high gloss and high reactivity.

Known processes to deal with the enhancement of properties of epoxy resins focus on either blending or copolymerizing epoxy resins with other polymers i.e carboxy- or amine-terminated acrylonitrile-butadiene rubbers, functionally terminated acrylates, poly(phenylene oxide) and alkylene oxides. However, the above processes generally lead to only incremental enhancement in the crosslink density, increase in hardness and decreases in tensile strength and modulus. The introduction of cyclopentyl and cyclohexyl groups in the siloxane backbone retains the crosslink density of the epoxy siloxane system. Some of the potential uses of epoxy functional siloxanes are in coatings, encapsulants, molding compounds, and matrix resins for fiber reinforced composites, among others. Due to the lower viscosity of these epoxy siloxanes, they can be used in adhesives, elastomers, liquid injection molding, and in room temperature vulcanizable rubbers.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A silicone comprising amino end groups, a cyclo-aliphatic alkyl group attached to a Si atom of the silicone, and a hydrogen atom attached to a Si atom of the silicone, wherein the cyclo-aliphatic alkyl group is selected from a cyclo-pentyl group or cyclo-hexyl group.

2. A method of preparing a film comprising:
    casting onto a substrate the silicone of claim 1 and an epoxide; and
    reacting the silicone of claim 1 with the epoxide.

3. A method of preparing a urea compound comprising:
    reacting the silicone of claim 1 with an isocyanate.

4. A method to synthesize a silicone comprising: conducting a base-catalyzed ring opening polymerization of a cyclic silicone with a diamine having the structural formula:

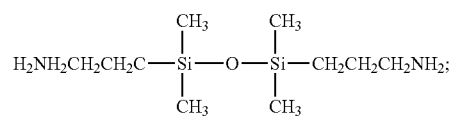

the cyclic silicone bearing a cyclo-aliphatic alkyl group attached to a Si atom thereof, the cyclo-aliphatic alkyl group selected from cyclohexyl and cyclopentyl groups, the base catalyzed reaction generating an silicone with the structural formula below

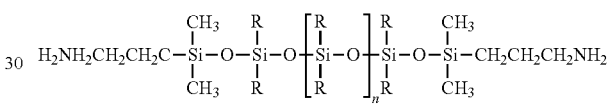

wherein each R is independently a hydrogen, cyclohexyl, or cyclopentyl group where at least 1 R is a cyclohexyl or cyclopentyl group, and n is equal to about 30 to about 45.

5. The method of claim 4 wherein the base catalyst is at least one of tetraalkylammonium hydroxide or tetraalkylphosphonium hydroxide.

6. The method of claim 4 wherein the silicone is further reacted with a glycidyl epoxy to produce a thermally curable polymer.

7. A method to synthesize an amine-functionalized silicone comprising: conducting a hydrosilation reaction of a silicone with

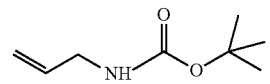

the silicone bearing a cyclo-aliphatic alkyl group attached to a Si atom thereof and a hydrogen atom attached to a Si atom thereof, the cyclo-aliphatic alkyl group selected from cyclohexyl or cyclopentyl groups; thereby generating the following intermediate

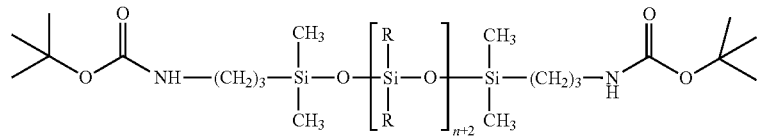

and,
deblocking the intermediate to form an amine-functionalized silicone having the structural formula:

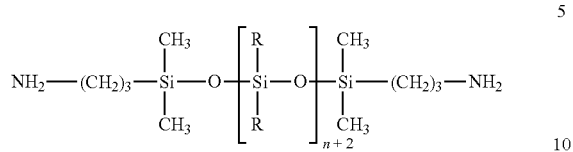

(5)

wherein each R is independently a hydrogen, cyclohexyl, or cyclopentyl group where at least 1 R is a cyclohexyl or cyclopentyl group, and n is equal to about 30 to about 45.

8. A silicone comprising amino end groups on a silicone of about 34 to about 49 Si atoms wherein a cyclo-aliphatic group is attached to a Si atom of the silicone, and the cyclo-aliphatic group is a cyclo-pentyl group or a cyclo-hexyl group.

9. The silicone of claim 1, wherein a methyl group is attached to a Si atom of the silicone.

10. The silicone of claim 8, wherein the silicone is defined by the following formula:

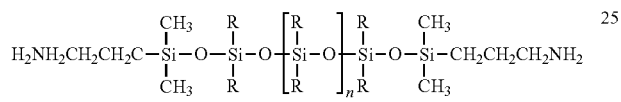

wherein each R is independently a hydrogen, cyclohexyl, or cyclopentyl group where at least 1 R is a cyclohexyl or cyclopentyl group, and n is equal to about 30 to about 45.

\* \* \* \* \*